United States Patent [19]

Dupraz

[11] Patent Number: 5,437,546
[45] Date of Patent: Aug. 1, 1995

[54] APPARATUS FOR COOLING OF A FILM, FOIL OR SHEET

[75] Inventor: Raymond Dupraz, Aix-les-Bains, France

[73] Assignee: Darlet Marchante Technologie S.A., Le Bourget du Lac, France

[21] Appl. No.: 143,568

[22] Filed: Oct. 26, 1993

[30] Foreign Application Priority Data

Oct. 26, 1992 [FR] France ............... 92 13072

[51] Int. Cl.⁶ .............................. B29D 7/00
[52] U.S. Cl. .................... 425/223; 264/216; 425/377; 425/325
[58] Field of Search ............. 264/216; 425/7, 223, 425/377, 325

[56] References Cited

U.S. PATENT DOCUMENTS

| | | | |
|---|---|---|---|
| 3,121,915 | 2/1964 | Heller | 264/216 |
| 3,141,194 | 7/1964 | Jester | 264/216 |
| 3,597,515 | 8/1971 | Widiger | 264/216 |
| 3,885,940 | 5/1975 | Levecque et al. | 425/7 |
| 3,941,086 | 5/1976 | Roncan | 118/63 |
| 4,071,589 | 1/1978 | Latham et al. | 264/216 |
| 4,255,365 | 3/1981 | Heyer | 264/216 |
| 4,524,716 | 6/1985 | Mueller | 118/665 |
| 4,822,267 | 4/1989 | Walz | 425/7 |
| 5,147,595 | 9/1992 | Sanderford | 264/216 |

FOREIGN PATENT DOCUMENTS 0051699   5/1982   European Pat. Off. .

OTHER PUBLICATIONS

Search Report (FR 9213072).

Primary Examiner—Jay H. Woo
Assistant Examiner—John Robert Abel
Attorney, Agent, or Firm—Herbert Dubno

[57] ABSTRACT

A foil or film of plastic or rubber is extruded and placed upon a cooled drum for the cooling of the film or foil with the aid of an air sheet derived from a nozzle section which extends above the drum transverse to the direction of displacement of the foil or film. The nozzle has flow deflectors which are responsible from the walls to vary the deflectors. The flow deflectors are convex toward one another and have air foil configurations while being designed to deflect respective streams outwardly along the edges of the foil to resist curvature.

5 Claims, 2 Drawing Sheets

APPARATUS FOR COOLING OF A FILM, FOIL OR SHEET

FIELD OF THE INVENTION

The present invention relates to an apparatus for cooling a layer, especially a foil, film or sheet of plastic or rubber, and more particularly, to the means in such apparatuses for holding, placing or applying the layer to the surface of a cooling drum.

BACKGROUND OF THE INVENTION

In numerous applications, it is necessary to rapidly cool molten, flowable or like products which may be less than coherent, in order to provide a coherent sheet, film or foil, the materials to be transformed into the layer being at a relatively high temperature. This is especially the case in the plastic industry and in the rubber industry.

In certain cases, especially when the products can have a crystalline nature depending upon the speed of cooling, the quality of the product obtained in the form of the film, foil or sheet will depend largely upon the cooling speed. For this purpose, the use of a cooling drum having a cooled cylindrical surface has been developed in the art.

Since the efficiency of a cooling drum depends, to a large part, on the intimacy of contact between the inner surface of the film and the external surface of the drum, it is important to hold those two surfaces in intimate contact over the entire width of the layer.

More generally, when the foil or sheet, extruded from an extrusion head or the like arrives at the drum without any precautions to insure intimate contact, the foil has a tendency not to adhere to the surface of the drum and, because of irregular cooling, deforms and can be completely unusable.

To remedy this drawback, a large number of prior art devices referred to as emplacement devices or placing devices have been used. One of these devices, which is widely used at the present time, presses the product to be cooled against the surface of the drum by a jet of air at high velocity at high pressure to insure an intimate contact of the foil with the drum; and to smooth the foil uniformly against the drum. Such devices are generally referred to as sheets of air.

An air sheet device for applying a foil or film against the drum can be constituted by a tubular body disposed transversely of the path of the foil above the drum, fed by a blower or a compressor and opening between two longitudinal lips formed at the end of a convergent portion into a slit which discharges a sheet of air oriented substantially radially with respect to the drum.

The level of elevated pressure which is maintained in the interior of the tubular body, thanks to the angle of convergence of the lips, insures an elevated speed of the flow of air which is effective to apply the foil or film to the drum.

The uniformity of the emplacement of the foil or film over the width thereof depends upon the uniformity of the opening between the lips and for different systems utilizing differential screw arrangements or even more sophisticated systems with deformable flexible lips, the gap between the lips can be controlled in order to obtain a jet which is homogeneous over the entire width of the film.

It should be evident that for uniform emplacement of the film, the width of the jet should be at least equal to the width of the film. If the width of the jet is less, emplacement or pressing force is insufficient along the edges of the film.

This problem of sufficient pressure at the edge is a primary source of problems for the prior art devices of the type described.

Depending upon the material from which the foil or film is constituted and the speed with which the foil material is deposited upon the drum, the width of the foil can vary on the drum to a greater or lesser extent.

For this reason, it is the current practice to utilize a width of the blowing device which exceeds the width of the film and under all circumstances under which the film or foil is deposited on the drum. Indeed, I am not aware of any system in this context which can adjust the width of the air jet to the width of the film without generating along the edges of the film turbulence which can cause the edges to lift away from the drum and effect the emplacement.

The provision of an airflow across the width of the film or foil which can extend beyond the edges, moreover, leads to a nonuniform effect as well as a result of the fact that upon extrusion, the edges of the foil or film can have a thickness which is generally greater than that of the rest of the film to minimize the tendency of the film to curl toward the face of the drum. A high speed jet at the edge can allow the passage of air underneath the foil where there is a tendency to curl and thus can result in a separation of the foil from the drum and nonuniform cooling. Particularly in the case of bi-oriented films it is common to use between the extrusion head and the point of impact of the air, supply air jets directed against the edges and whose function is to emplace the edges of the film upon the drum and thereby create a flattening effect before the film reaches the point of impact of the main air curtain utilized to emplace the film against the drum. While this system is effective to obviate some of the drawbacks enumerated above, it is necessary to mount the supplemental jets on high accuracy positioning devices and to set the angular orientation of the jet with precision for a particular film. Regrettably, the edges of the foil or film are of an unstable nature and change as a function of a temperature of the material or the viscosity thereof readily. The edge jets, therefore, are difficult to control and constitute a perpetual force of trouble.

OBJECTS OF THE INVENTION

It is therefore an object of the present invention to provide a system for cooling a layer utilizing a cooling drum and an emplacement device which is substantially free from the drawbacks enumerated above and which can insure a uniform and homogeneous cooling without problems along the edges of the foil or film.

Another object of this invention is to provide an apparatus for cooling a foil or film and which eliminates the problems of air curtains of a width greater than the width of the foil, which can eliminate the need for edge jets as supplemental to the air curtain and which, in general, greatly simplifies the control of a jet for a given width of foil in spite of the fact that the width may change from time to time.

SUMMARY OF THE INVENTION

These objects and others which will become apparent hereinafter are attained with the invention with a device which, in the longitudinal converging section of the air curtain generator and disposed inwardly from each of the lateral or end walls of the tubular body, a flow deflector is provided which is mounted on a means for controlling its axial or longitudinal position with respect to a respective end or lateral wall of the tubular body.

Each flow deflector has a part which in transverse section has an identical shape to the section of the converging portion and is received therein with just sufficient play to enable it to slide and function as an adjustable flow deflector. In addition, each flow deflector has a convex profile, i.e. a convex surface turned toward the other flow deflector of a form corresponding generally to the air foil or top of an aircraft wing and whose pole or curve is so defined that it directs the flow of air progressively outwardly without separation of that flow from the deflector in such manner as to cause turbulence.

The device of the invention thus can generate a sheet of air which is directed against the foil or film and which is transverse thereto and generally radial of the drum of sheet of air being composed in its central portion of air streamlets which are parallel to one another and are radial with respect to the drum axis while at the two edges, the streamlets of air are deflected outwardly with a speed which is nearly equal to that of the central part but in directions inclined with respect to them to counter any tendency of the foil or film to curl.

With this device the foil or film is applied over its entire width over its edges uniformly to the drum and any tendency of the film or foil to curl is precluded.

The device has been found to eliminate the need for special jets along the edges as well.

More particularly, an apparatus for cooling a layer can comprise:

a cooling drum having a substantially horizontal axis, a layer to be cooled being deposited upon a cylindrical exterior surface of the drum; and means above the drum for directing a sheet of air against the exterior and the layer thereon, the means for directing the sheet of air including:

a duct extending substantially horizontally above the drum and the layer along at least a maximum width of the layer, means for connecting the duct to a source of air under pressure, a nozzle formation on the duct having end walls and converging toward a discharge slit, defined between a pair of longitudinally extending lips, training the sheet of air against the layer, and a pair of flow deflectors each affixed to a respective means for adjusting a position of the respective deflector along the width of the layer relative to the respective end wall and extending from the respective end wall, the flow deflectors being of cross sections corresponding to that of the nozzle formation on the duct but received with play in the formation enabling shifting of the deflector therealong, the flow deflectors having surfaces turned toward one another which are convex toward one another and curved with a cross sectional profile of each deflector conforming generally in shape to an upper airfoil face of an aircraft wing, the surfaces of the flow deflectors having polar curves inclined toward respective outer edges of the layer for progressively deflecting air outwardly without flow separation of air flowing along the surface from the surface.

According to a feature of the invention a respective obturator plate is connected to each of the flow deflectors, extending through the respective end wall and blocking flow from the duct through the nozzle means to the discharge slot between the respective flow deflector and the respective end wall.

Each means for adjusting a position of the respective flow deflector includes a sleeve extending outwardly from the respective end wall, a cylindrical rod connected to the respective flow deflector and extending axially through the respective sleeve, the rod having a threaded portion within the sleeve, and a knob rotatable on the respective sleeve and having an internal thread screwed onto the threaded portion of the respective rod, the rod being nonrotatable relative to the respective end wall and sleeve, whereby rotation of each knob axially shifts the respective rod and flow deflector.

In addition, each plate outside the nozzle formation is juxtaposed with a scale of distance provided on the respective sleeve for reading out a position of the respective flow deflector in the nozzle formation.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 2:
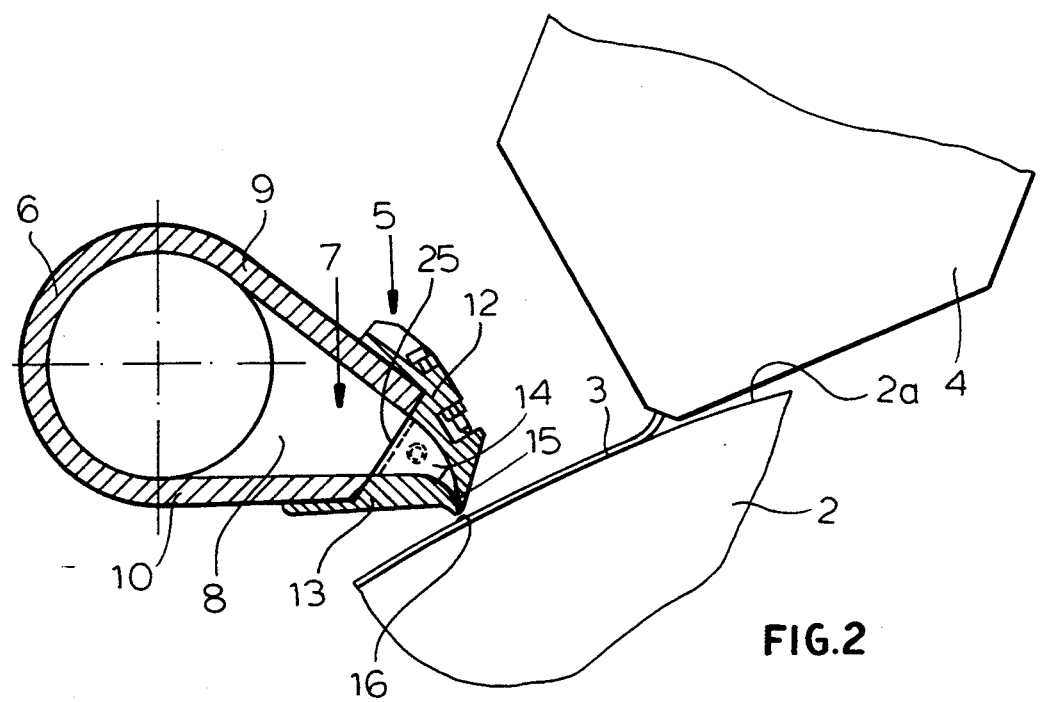
FIG. 2 is a cross sectional view taken along line II—II of FIG. 1 but drawn to a larger scale.
Figure 3:
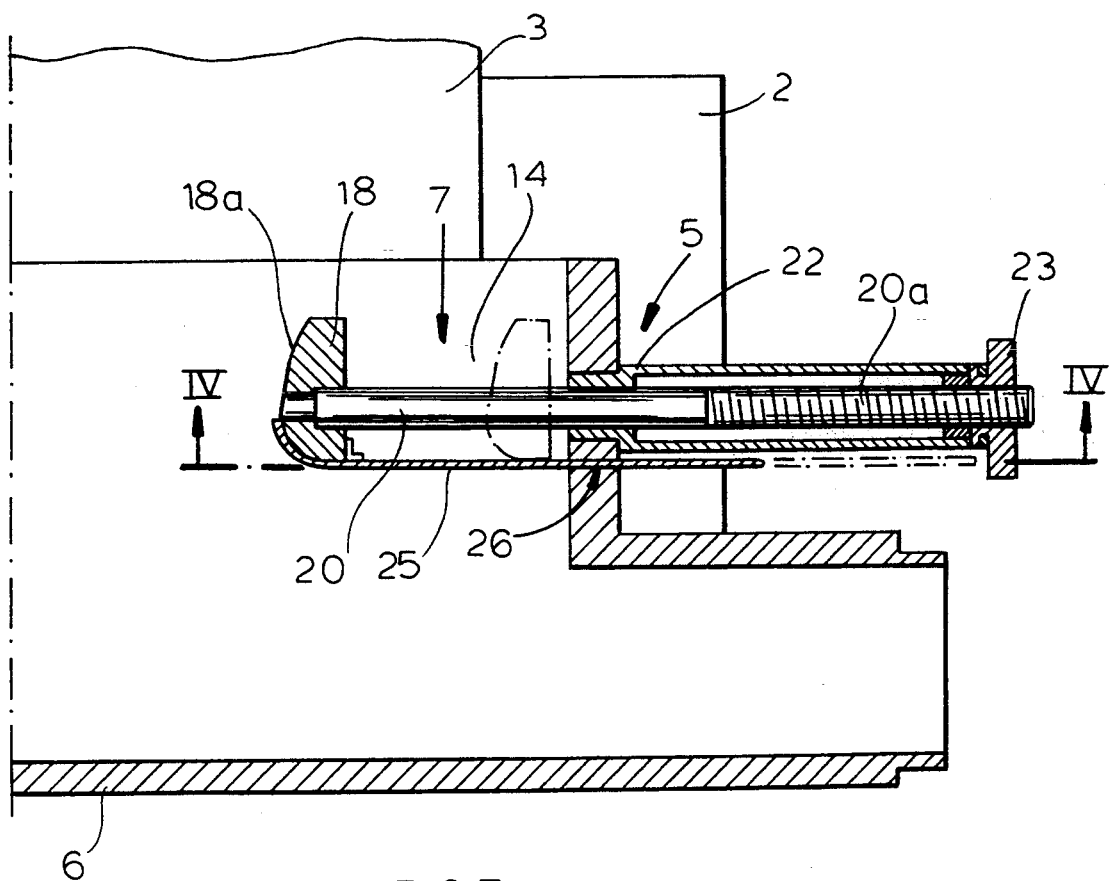
FIG. 3 is a detailed view taken in section in a longitudinal plane in the region of one of the flow deflectors and drawn to a yet greater scale.

In the drawing, I have shown a cooling drum 2 having a cylindrical outer surface 2a which can be chilled by any conventional means and receives a foil or film 3 of a synthetic resin metal or rubber from an extrusion head 4 best shown in FIG. 2. In addition to the cooling drum 2 and the means for depositing the foil or film 3, the apparatus comprises a device 5 for assuring the emplacement of the foil or film 3 on the drum 2.

Figure 1:
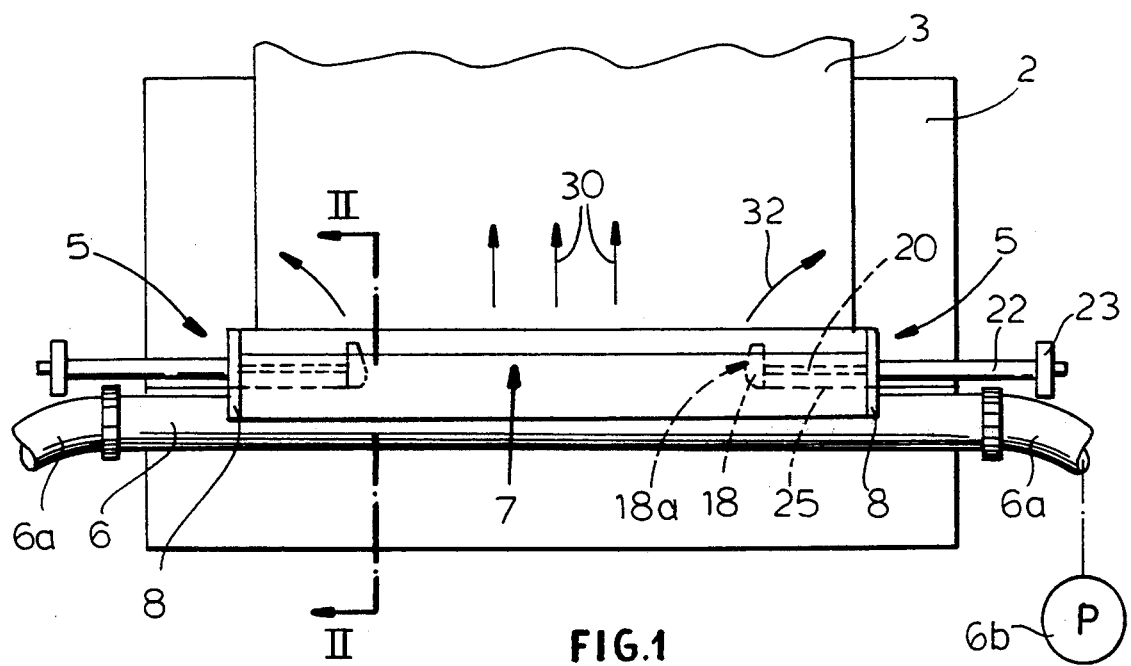
FIG. 1 is a plan view of an apparatus according to the invention.

This device is comprised of a tubular body 6 connected by conventional means, e.g. the pipes 6a to a compressor or blower represented diagrammatically at 6b in FIG. 1, namely to a source of compressed air or air under pressure. This body 6, disposed transversely to the direction of travel of the foil or film web above the drum, i.e. with its longitudinal axis perpendicular to the direction of displacement and parallel to the axis of the drum, comprises at its front end, a converging nozzle 7 delimited by two end or lateral walls 8 and by two longitudinal walls, namely, an upper wall 9 and a lower wall 10.

At their free edges, the walls 9 and 10 are contained by two lips, namely, an upper lip 12 and a lower lip 13 which define an internal space 14 discharge through a slit 15 above the foil or film 3. The outflow through this slit is a sheet of air 16 or an air curtain, whose median plane is substantially radial with respect to the drum. According to the invention, the device comprises, in the nozzle portion 7 and projecting inwardly from each of the lateral or end walls 8, a respective flow deflector 18 for the air.

FIG. 2 shows that each flow deflector has, in a transverse section, a shape identical to the nozzle portion 7 in which it is received and hence the terminal side of the nozzle 7, except for the play necessary to allow the flow deflector to move within the nozzle between the lips 12 and 13.

Each flow deflector, moreover, is of a profile which is convex at 18 toward the other flow deflector and has the general shape of an air foil or upper side of an aircraft wing, i.e. has a curvature whose polar curve is inclined toward the exterior to direct the flow of air which adheres to the flow deflector along this profile and without separation from the air foil surface, i.e. without formation of turbulence which may disturb the jets of air.

Each flow deflector 18 is mounted on the internal end of a cylindrical rod 20 shaping transversely through the respective lateral or end wall 8. In the embodiment illustrated, the rod 20 transverses axially a sleeve 22 disposed externally of the nozzle. At its free end, each sleeve 22 has a knob 23 which is rotatable on the sleeve and axially fixed thereto and which is internally threaded to engage the externally threaded body 20 of the rod 20. Upon rotation of the knob 23, a micrometric control of the position of the flow deflector 18 in the nozzle 7 can be achieved.

The rod 20 is prevented from rotating relative to the wall 8. This can be achieved by the provision of an obturating plate 25 whose internal end is rigid with flow deflector 18 and which transverses the wall 8 through a slot 26 formed therein.

As is shown in FIG. 2, this plate extends the entire width of the nozzle so as to prevent any passage of air through the nozzle to the slit 16 between the end of the flow deflector 18 and the end wall 8.

Figure 4:
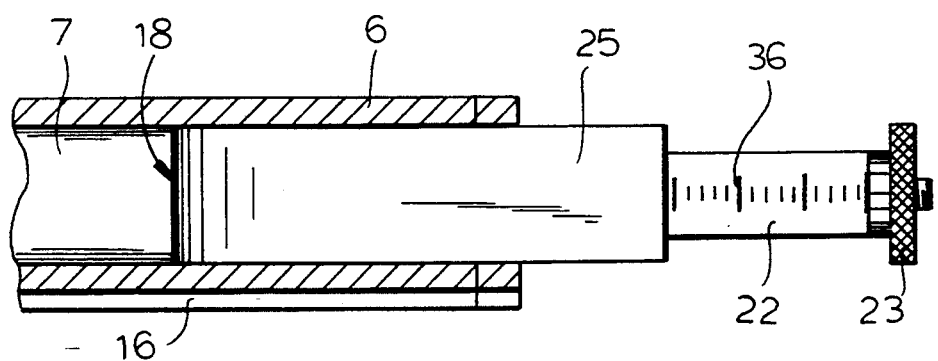
FIG. 4 is a sectional view taken along the line IV–IV of FIG. 3.

The external end of the plate 25 cooperates, as can be seen in FIG. 4, with graduations 36 on the sleeve 22 to indicate at the exterior the longitudinal position of the respective flow deflector in the interior of the nozzle 7. The flow of air supplied to the tubular body 6 is converted into a sheet of air 16 with streamlets 30 (FIG. 1) in a direction substantially radial to the drum 2 and parallel to one another.

Only the streamlets of air 32 along the flow deflectors 18 are progressively inclined to the exterior in order to enlarge the width of the air sheet or curtain without producing a significant reduction of speed in the air and without creating turbulence which can disturb the uniformity of the flow and the quality of application of the foil or film to the surface 2a of the drum as may be required, the position of each flow deflector 18 in the nozzle 7 can be regulated precisely by rotation of the knob 23 and actuation of the position control means for the flow deflector.

In general, the flow deflectors are controlled to lie inwardly of the edges of the foil 3 so that the outward streams of air can oppose any tendency of the edges of the foil to curl. The device of the invention not only provides an excellent application of the foil or film to the cooled drum, but allows for variation in the width of the foil or drum through the extrusion process.

Furthermore, should the variations in the width of the foil be excessive, the invention allows the flow directors 18 to be adjusted in a position which is improbable with prior art devices.

Finally, the device according to the invention eliminates the need for edge jets as has been necessary hitherto and, of course, any need for continuous adjustment of the positions of such jets by reason of the variation in the width of the foil or sheet.

I claim:

1. An apparatus for cooling a layer, comprising
a cooling drum having a horizontal axis and a cylindrical exterior surface upon which a layer to be cooled can be deposited; and
means above said drum for directing a sheet of air against said exterior and said layer thereon, said means for directing said sheet of air including:
a duct extending horizontally above said drum and said layer along at least a maximum width of said layer,
means for connecting said duct to a source of air under pressure,
a nozzle formation on said duct having end walls and converging toward a discharge slit, defined between a pair of longitudinally extending lips, directing said sheet of air against said layer, and
a pair of flow deflectors each affixed to a respective means for adjusting a position of the respective deflector along the width of said layer relative to the respective end wall and extending from the respective end wall, said flow deflectors being of cross sections corresponding to that of said nozzle formation on said duct but received with play in said formation enabling shifting of the deflector therealong, said flow deflectors having surfaces turned toward one another which are convex toward one another and curved with a cross sectional profile of each deflector conforming generally in shape to an upper airfoil face of an aircraft wing, said surfaces of said flow deflectors having polar curves inclined toward respective outer edges of the layer for progressively deflecting air outwardly without flow separation of air flowing along the surface from the surface.

2. The apparatus defined in claim 1, further comprising a respective obturator plate connected to each of said flow deflectors, extending through the respective end wall and blocking flow from said duct through said nozzle means to said discharge slot between the respective flow deflector and the respective end wall.

3. The apparatus defined in claim 2 wherein each said means for adjusting a position of the respective flow deflector includes a sleeve extending outwardly from the respective end wall, a cylindrical rod connected to the respective flow deflector and extending axially through the respective sleeve, said rod having a threaded portion within said sleeve, and a knob rotatable on the respective sleeve and having an internal thread screwed onto the threaded portion of the respective rod, said rod being nonrotatable relative to the respective end wall and sleeve, whereby rotation of each knob axially shifts the respective rod and flow deflector.

4. The apparatus defined in claim 3 wherein an edge of each plate outside said nozzle formation is juxtaposed with a scale of distance provided on the respective sleeve for reading out a position of the respective flow deflector in said nozzle formation.

5. The apparatus defined in claim 1 wherein each said means for adjusting a position of the respective flow deflector includes a sleeve extending outwardly from the respective end wall, a cylindrical rod connected to the respective flow deflector and extending axially through the respective sleeve, said rod having a threaded portion within said sleeve, and a knob rotatable on the respective sleeve and having an internal thread screwed onto the threaded portion of the respective rod, said rod being nonrotatable relative to the respective end wall and sleeve, whereby rotation of each knob axially shifts the respective rod and flow deflector.

* * * * *